Nov. 12, 1957 R. GAERTNER 2,812,927
DOUGH MIXER
Filed Nov. 3, 1954 2 Sheets-Sheet 1

Richard Gaertner
INVENTOR.

BY
Attorneys

Nov. 12, 1957 R. GAERTNER 2,812,927
DOUGH MIXER

Filed Nov. 3, 1954 2 Sheets-Sheet 2

Richard Gaertner
INVENTOR.

BY
Attorneys

United States Patent Office 2,812,927
Patented Nov. 12, 1957

2,812,927

DOUGH MIXER

Richard Gaertner, Moulton, Tex.

Application November 3, 1954, Serial No. 466,491

1 Claim. (Cl. 259—88)

This invention relates to a dough mixer and more specifically provides a device for mixing yeast containing doughs for thoroughly intermingling the ingredients thereby forming a homogeneous mixture.

An object of this invention is to provide a dough mixer for mixing the various ingredients of dough wherein the device is especially adapted for home use in mixing doughs for bread, or the like.

Another object of the present invention is to provide a dough mixer including a removable receptacle driven by a motor and including a mixing blade extending into the receptacle wherein the mixing blade is stationary and the receptacle rotates thereby thoroughly mixing the contents of the receptacle.

A further object of the present invention is to provide a dough mixer that is simple in construction, easy to use, easy to clean, efficient in operation, well adapted for its intended purposes and relatively inexpensive to manufacture.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1:
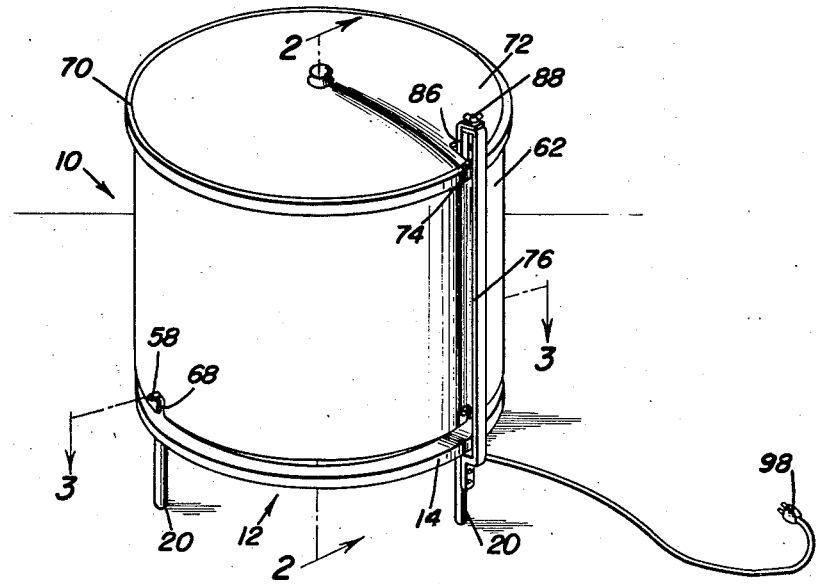
Figure 1 is a perspective view of the dough mixer of the present invention.
Figure 3:
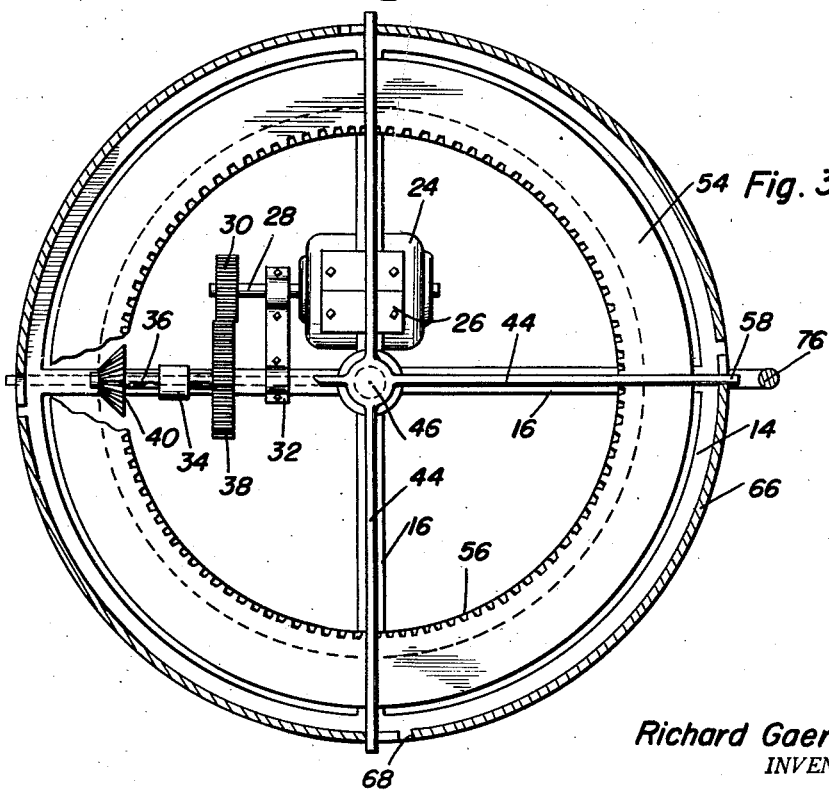
Figure 3 is a top plan sectional view taken substantially upon a plane passing along section line 3—3 of Figure 1 showing further structural details of the operating mechanism of the dough mixer of the present invention.
Figure 2:
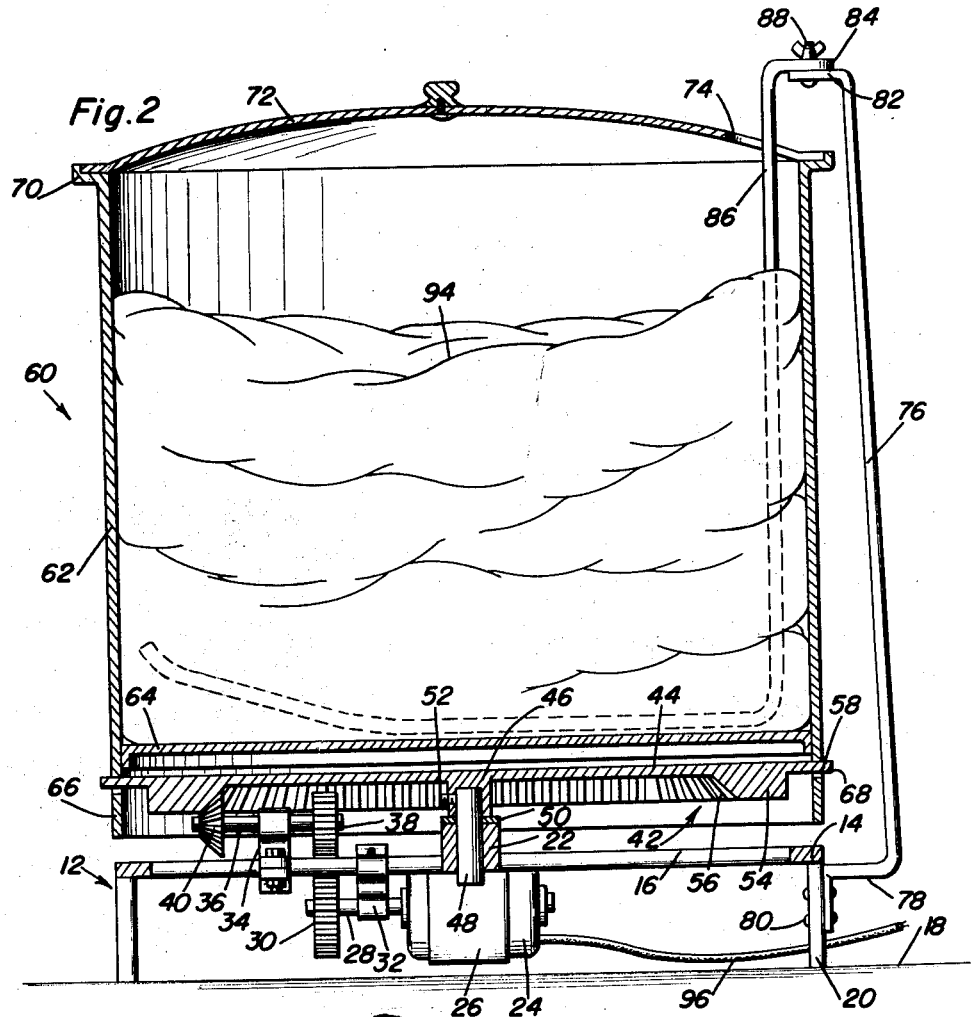
Figure 2 is a vertical, sectional view taken substantially upon a plane passing along section line 2—2 of Figure 1 showing the details of construction of the dough mixer.
Figure 4:
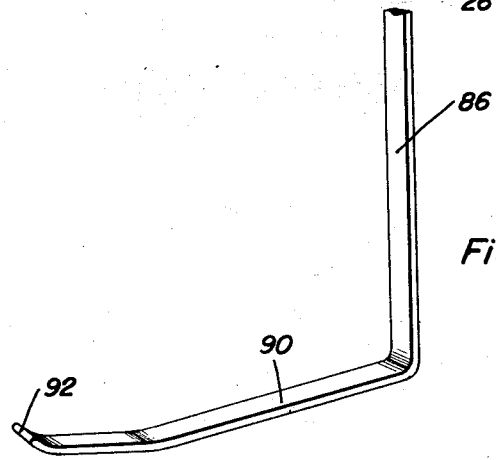
Figure 4 is a perspective view showing the details of construction of the mixing blade for intermingling the ingredients of the dough into a homogeneous mixture.

Referring now specifically to the drawings, it will be seen that the numeral 10 generally designates the dough mixer of the present invention. The dough mixer 10 generally includes a base indicated by the numeral 12 and including an annular ring 14 connected by cross members 16 and supported in spaced relation to a supporting surface 18 by a plurality of depending legs 20. The central portion of the cross members 16 is provided with a hub 22 which upstands vertically from the cross members 16. In depending relation to one of the cross members 16 is a motor 24 mounted by a suitable bracket 26. The motor 24 is provided with a drive shaft 28 having a gear 30 thereon. The drive shaft 28 is supported in a bracket 32 mounted on one of the cross members 16. Positioned above the cross member 16 is another supporting bracket 34 journalling a shaft 36 thereon having a gear 38 on one end in meshing engagement with the gear 30 and a bevel gear 40 on the other end for a purpose described hereinafter. The gear 30 is generally smaller than the gear 38 thereby reducing the rotational speed of the shaft 28 of the motor 24 to the desired speed.

Rotatably positioned on the base 12 is a platform generally designated by the numeral 42 and including a pair of cross members 44 having a central hub 46 with a pin 48 extending downwardly therefrom for journaling in the hub 22 in the base 12. A thrust washer 50 is provided between the lower end of the hub 46 and the upper end of the hub 22 for forming a thrust bearing for the platform 42. The pin 48 is rigidly secured to the hub 46 by a setscrew 52. An annular ring 54 is formed integrally with the cross members 44 adjacent the outer end thereof and includes an internal bevel ring gear 56 for meshing engagement with the bevel gear 40 on the shaft 36 wherein the platform 42 will be rotated by the motor 24. Each of the projecting members 44 project beyond the annular ring 54 and form a plurality of lugs 58 for detachably connecting a receptacle generally indicated by the numeral 60 to the platform 42. The receptacle 60 is generally cylindrical and includes a cylindrical side wall 62, a flat bottom 64 and a depending peripheral flange 66 which depends below the bottom 64. The depending flange 66 is provided with a plurality of right angle slots or bayonet slots 68 in spaced relation for alignment and registry with the projecting lugs 58 on the platform 42 thereby detachably securing the receptacle 60 to the platform 42 by use of the lugs 58 and the bayonet slots 68 thereby forming a bayonet-type connection. At the upper end of the cylindrical wall 62 is an outwardly and upwardly extending peripheral flange 70 for receiving and positioning a top closure member 72. The top closure member 72 is provided with an enlarged slot or opening 74 at one side thereof for a purpose described hereinafter.

Secured to one of the legs 20 is an upstanding supporting arm 76 having an offset lower end 78 for attachment to the leg 20 by suitable fastening means 80. The upstanding arm 76 terminates at its upper end in an inwardly extending portion 82 for engagement with a laterally extending upper end 84 on a depending mixing blade 86. The lateral portion 82 of the arm 76 and the lateral portion 84 of the blade 86 are detachably secured together by a fastening bolt 88. The depending blade 86 projects through the opening 74 in the top 72 and extends downwardly alongside the cylindrical side wall 62 of the receptacle 60 to a point substantially adjacent the bottom 64 of the receptacle 60 whereby the blade 86 will hold the top 72 stationary. The lower end of the depending blade 86 terminates in a laterally extending portion 90 which extends substantially parallel to and closely adjacent the bottom 64 of the receptacle 60. The free end of the laterally extending portion 90 terminates in an upwardly curved portion 92 beginning adjacent the center of the bottom of the receptacle which thoroughly mixes the dough 94 within the receptacle 60 when the receptacle 60 is rotated by the motor 24. The mixing blade 86 together with the laterally extending portion 90 and the upturned portion 92 may be in the form of a flat bar member with the narrow edge or the wide face thereof mixing the dough 94 and the particular angle of upward curve of the free end 92 of the laterally extending portion 90 may be offered for mixing the dough 94 in the most efficient manner.

In practical operation, the motor 24 is actuated through an electrical conductor 96 having a suitable plug 98 on the end thereof for insertion into an electrical outlet (not shown) and by actuation of the motor 24, the platform 42 will be rotated and the receptacle 60 rotated therewith. The mixing blade 86 is stationary since it is fastened to the stationary arm 76 wherein the relative movement between the receptacle 60 and the mixing blade 86 will thoroughly mix and intermingle the ingredients of the dough 94 into a homogeneous mixture. The receptacle 60 should be relatively small for holding approximately two to three gallons so that the mixer 10 may be utilized in mixing the dough for several loaves of bread at the same time in order that the device may be especially adapted for home use.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A dough mixer comprising a base, a rotatable platform on said base, a receptacle having a bottom and side wall mounted on said platform, an upstanding arm mounted on said base and projecting above said receptacle, a depending mixing blade secured to the upper end of the arm and extending into the receptacle closely adjacent the side wall thereof, said blade terminating in a laterally extending portion extending across the bottom of the receptacle, and means for rotating said platform for mixing dough within the receptacle, said platform including a plurality of laterally projecting lugs, said receptacle having a depending peripheral flange, a plurality of bayonet-type slots in said flange for detachably receiving said lugs, said rotating means including an electric motor, a ring gear mounted on said platform, and a reduction gearing system interconnecting said motor and ring gear for rotating said platform, said receptacle including a separate top, said top having an opening in one side thereof for receiving said depending blade, and an upstanding peripheral flange on the upper end of the receptacle for receiving said top whereby the top will be held stationary, said laterally extending portion of said blade curving upwardly on the free end thereof for mixing dough in the receptacle with the upwardly curved portion beginning adjacent the center of the bottom of the receptacle.

References Cited in the file of this patent
UNITED STATES PATENTS

| | | |
|---|---|---|
| 34,383 | Vincent et al. | Feb. 11, 1862 |
| 847,765 | Hall | Mar. 19, 1907 |
| 1,027,172 | Bigelow | May 21, 1912 |
| 1,302,923 | Hills | May 6, 1919 |
| 1,772,083 | Hollenback | Aug. 5, 1930 |